(12) United States Patent
Wu

(10) Patent No.: US 11,113,998 B2
(45) Date of Patent: Sep. 7, 2021

(54) GENERATING THREE-DIMENSIONAL USER EXPERIENCE BASED ON TWO-DIMENSIONAL MEDIA CONTENT

(71) Applicant: Tencent Technology (Shenzhen) Company Limited, Shenzhen (CN)

(72) Inventor: Xinwan Wu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/569,493

(22) Filed: Sep. 12, 2019

(65) Prior Publication Data
US 2020/0005689 A1 Jan. 2, 2020

Related U.S. Application Data

(63) Continuation of application No. PCT/CN2017/098433, filed on Aug. 22, 2017.

(51) Int. Cl.
*G09G 3/00* (2006.01)
*H04N 13/156* (2018.01)

(52) U.S. Cl.
CPC ........... *G09G 3/003* (2013.01); *H04N 13/156* (2018.05); *G09G 2340/10* (2013.01); *G09G 2340/12* (2013.01)

(58) Field of Classification Search
None
See application file for complete search history.

(56) References Cited

U.S. PATENT DOCUMENTS 8,565,520 B2  10/2013  Williams et al.
2002/0156866 A1*  10/2002  Schneider ............. G06F 16/955
    709/218

(Continued)

FOREIGN PATENT DOCUMENTS

CN    106415667 A    2/2017

OTHER PUBLICATIONS

Tencent Technology, IPRP, PCT/CN2017/098433, Feb. 25, 2020, 5 pgs.

(Continued)

*Primary Examiner* — Michelle Chin
(74) *Attorney, Agent, or Firm* — Morgan, Lewis & Bockius LLP

(57) ABSTRACT

The present application provides methods and systems for generating three-dimensional user experience from two-dimensional media content such as a sequence of image frames received by a mobile device. The mobile device recognizes locations of a moving object in the sequence of image frames and applies a user-selected foreground template to the sequence of image frames by covering at least a portion of each image frame rendered on the display. When there is an overlap between the location of the moving object within one of the sequence of image frames and the predetermined foreground template, the device identifies, within the image frame, at least a portion of the moving object covered by the foreground template, and renders the covered portion of the moving object in front of the foreground template while a remaining portion of the image frame is rendered behind the foreground template.

20 Claims, 14 Drawing Sheets

(56) References Cited

U.S. PATENT DOCUMENTS

| | | | | |
|---|---|---|---|---|
| 2009/0077504 A1* | 3/2009 | Bell | ................... | G06F 3/04812 |
| | | | | 715/863 |
| 2010/0039500 A1* | 2/2010 | Bell | ................... | H04N 13/254 |
| | | | | 348/46 |
| 2010/0060722 A1* | 3/2010 | Bell | ................... | G06F 3/04845 |
| | | | | 348/51 |
| 2011/0142335 A1* | 6/2011 | Ghanem | .............. | G06K 9/6215 |
| | | | | 382/165 |
| 2012/0106797 A1* | 5/2012 | Wang | ................ | G06K 9/00771 |
| | | | | 382/103 |
| 2012/0314942 A1* | 12/2012 | Williams | ................ | G06T 7/194 |
| | | | | 382/164 |
| 2015/0310660 A1* | 10/2015 | Mogilefsky | ........... | G06T 15/405 |
| | | | | 345/422 |
| 2018/0286199 A1* | 10/2018 | Chen | ........................ | G06K 9/38 |
| 2018/0357212 A1* | 12/2018 | Windmark | ............ | G06F 40/169 |

OTHER PUBLICATIONS

Tencent Technology, ISRWO, PCT/CN2017/098433, Dec. 19, 2017, 7 pgs.

\* cited by examiner

GENERATING THREE-DIMENSIONAL USER EXPERIENCE BASED ON TWO-DIMENSIONAL MEDIA CONTENT

CROSS-REFERENCE TO RELATED APPLICATIONS

This application is a continuation application of PCT/CN2017/098433, entitled "GENERATING THREE-DIMENSIONAL USER EXPERIENCE BASED ON TWO-DIMENSIONAL MEDIA CONTENT" filed on Aug. 22, 2017, which is incorporated by reference in its entirety.

TECHNICAL FIELD

The disclosed implementations relate generally to the field of image conversion technologies, and in particular, to a method of generating three dimensional (3D) effects based on two-dimensional (2D) media contents and a system implementing the method.

BACKGROUND

With the growing popularity of using images or videos with special effect, users are looking for creative and convenient ways of generating media contents with some interesting 3D effects. For example, a user may choose to reposition a photo or video within a frame or a template to make the photo or video look more interesting. The frame or template often contains some special designs or patterns to complement the content in the photo or video. But a user does not have any interaction with any elements within the existing photo or video. There is no relationship between any elements in the media content and the template. The final combined effect of the combined photo/video and the template does not seem vivid.

SUMMARY

An objective of the present application is to generate images or videos with 3D effects without the aid of any 3D glasses and highlight the motion of the main object in the media content, so as to expand a user's interaction with the media content and enrich the user's experience while generating the media content.

In order to achieve the foregoing beneficial effects, the present application is directed to a method of generating three-dimensional (3D) effect on a two-dimensional display, which includes the following steps: at a computing device having one or more processors and memory storing one or more programs for execution by the one or more processors: receiving a sequence of image frames; recognizing locations of a moving object in the sequence of image frames; and rendering, on the display, the sequence of image frames with a predetermined foreground template covering at least a portion of each image frame rendered on the display, further including: when there is an overlap between the location of the moving object within a respective one of the sequence of image frames and the predetermined foreground template: identifying, within the image frame, at least a portion of the moving object covered by the predetermined foreground template, and rendering, on the display, the covered portion of the moving object in front of the predetermined foreground template while a remaining portion of the image frame is rendered behind the predetermined foreground template.

In an implementation of the present application, the steps further include: recognizing a static background in the sequence of image frames, the static background being distinct from the predetermined foreground template.

In an implementation of the present application, the remaining portion of the image frames rendered behind the predetermined foreground template comprises a remaining portion of the moving object not covered by the predetermined foreground template and the static background.

In an implementation of the present application, the computing device includes a camera.

In an implementation of the present application, receiving the sequence of image frames includes recording a video clip.

In an implementation of the present application, the predetermined foreground template is selected from a plurality of foreground templates.

In an implementation of the present application, the predetermined foreground template includes a frame covering a plurality of edges of the image frame.

In an implementation of the present application, the portion of the moving object covered by the predetermined foreground template is rendered at the edges of the image frame above the predetermined foreground template.

In an implementation of the present application, the moving object is a human character and recognizing locations of the moving object comprises recognizing the locations of the human character by face recognition.

In an implementation of the present application, recognizing locations of the moving object comprises recognizing the locations of the moving object by motion recognition.

In an implementation of the present application, the moving object includes a person, an animal, or a vehicle, or any combination thereof.

In an implementation of the present application, the step of rendering, on the display, the sequence of image frames with the predetermined foreground template includes rendering a video clip with 3D effect.

Another objective of the present application is to provide a device, so as to generate images or videos with a 3D effect and highlight the motion of the main object in the media content.

In order to achieve the foregoing beneficial effects, the present application is directed to a mobile device, which includes: a display; one or more processors; and memory having instructions stored thereon, which when executed by the one or more processors cause the processors to perform operations, which include the following steps: receiving a sequence of image frames; recognizing locations of a moving object in the sequence of image frames; and rendering, on the display, the sequence of image frames with a predetermined foreground template covering at least a portion of each image frame rendered on the display, further including: when there is an overlap between the location of the moving object within a respective one of the sequence of image frames and the predetermined foreground template: identifying, within the image frame, at least a portion of the moving object covered by the predetermined foreground template, and rendering, on the display, the covered portion of the moving object in front of the predetermined foreground template while a remaining portion of the image frame is rendered behind the predetermined foreground template.

In accordance with some implementations of the present application, the present application is directed to a non-transitory computer-readable storage medium, having instructions stored thereon, which when executed by one or more processors cause the processors to perform operations, which include the following steps: receiving a sequence of image frames; recognizing locations of a moving object in the sequence of image frames; and rendering, on the display, the sequence of image frames with a predetermined foreground template covering at least a portion of each image frame rendered on the display, further including: when there is an overlap between the location of the moving object within a respective one of the sequence of image frames and the predetermined foreground template: identifying, within the image frame, at least a portion of the moving object covered by the predetermined foreground template, and rendering, on the display, the covered portion of the moving object in front of the predetermined foreground template while a remaining portion of the image frame is rendered behind the predetermined foreground template.

Other features and advantages of the present application can become apparent from the following detailed description, taken in conjunction with the accompanying drawings, demonstrating by way of examples the principles of the present application.

BRIEF DESCRIPTION OF DRAWINGS

The aforementioned implementation of the invention as well as additional implementations will be more clearly understood as a result of the following detailed description of the various aspects of the invention when taken in conjunction with the drawings. Like reference numerals refer to corresponding parts throughout the several views of the drawings.

DETAILED DESCRIPTION

Figure 1:
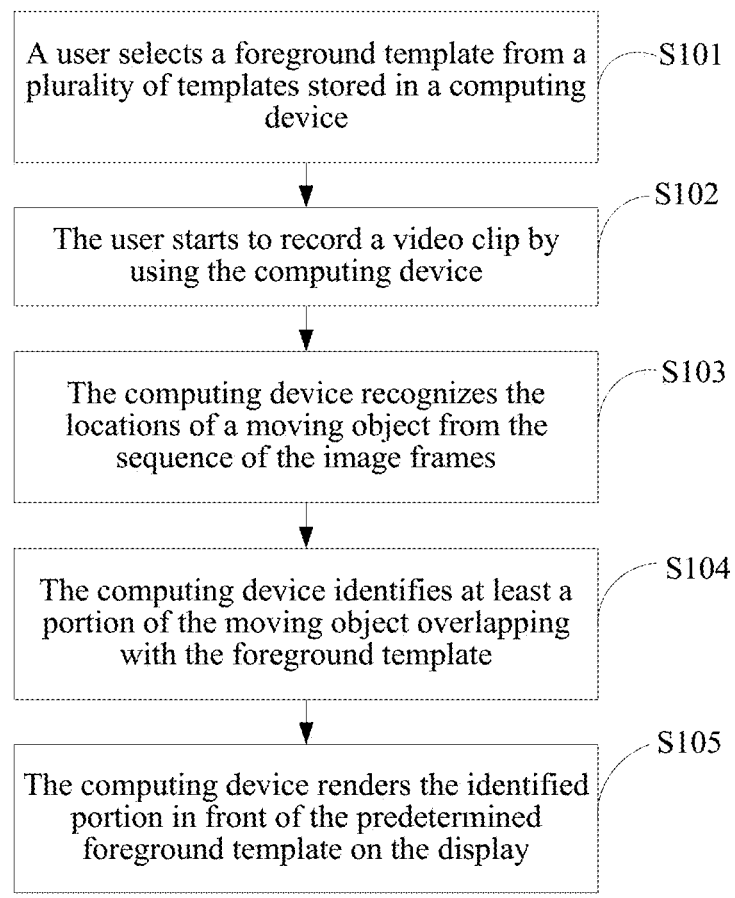
FIG. 1 is a schematic flow chart of an exemplary implementation of a 3D effect media content generating method in accordance with some implementations of the present application.

The description of the following implementations refers to the accompanying drawings, so as to illustrate specific implementations that may be implemented by the present application. Direction terminologies mentioned in the present application, such as "upper", "lower", "front", "rear", "left", "right", "inner", "outer", "side" are only used as reference of the direction of the accompany drawings. Therefore, the used direction terminology is only used to explain and understand the present application, rather than to limit the present application. In the figure, units with similar structures are represented in same reference numerals.

FIG. 1 is a schematic flow chart of an exemplary implementation of a 3D effect media content generating method in accordance with some implementations of the present application.

In Step S101, in one embodiment, a user selects a foreground template from a plurality of templates stored in a device which includes or connects to a camera. For example, the device can be a mobile phone, a digital camera, or any device that can capture photos or videos. The device can include a microprocessor, a memory, and some software programs stored in the memory. The software programs are executed by one or more processors. Alternatively, the device can include some hardware programs designed for a specific application such as an application-specific integrated circuit. The user can select the foreground template from a user interface where a number of templates are available for selection.

The templates can also be stored on a website, for example, a cloud system or any storage media. And the user can load the templates to the device and then select a template. In some other instance, the user can retrieve the templates directly from the internet.

In some embodiments, the device includes a display on which the predetermined foreground template can be shown.

Figure 2A:
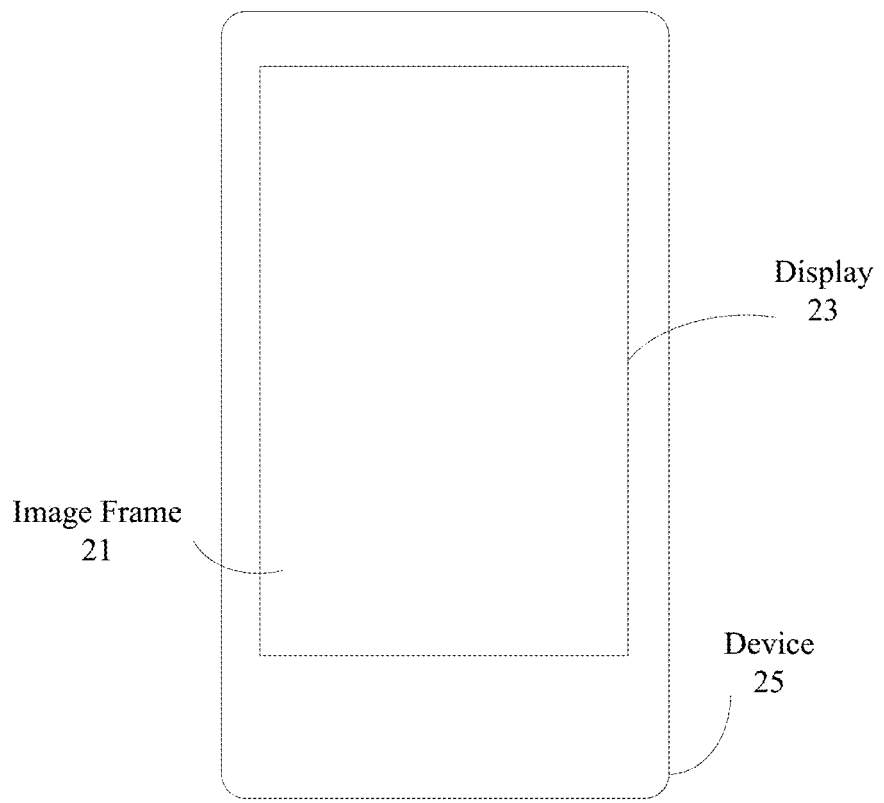
FIG. 2A is a schematic diagram of an exemplary image frame shown on a display of a device before the selection and application of a predetermined template in accordance with some implementations of the present application.
Figure 2B:
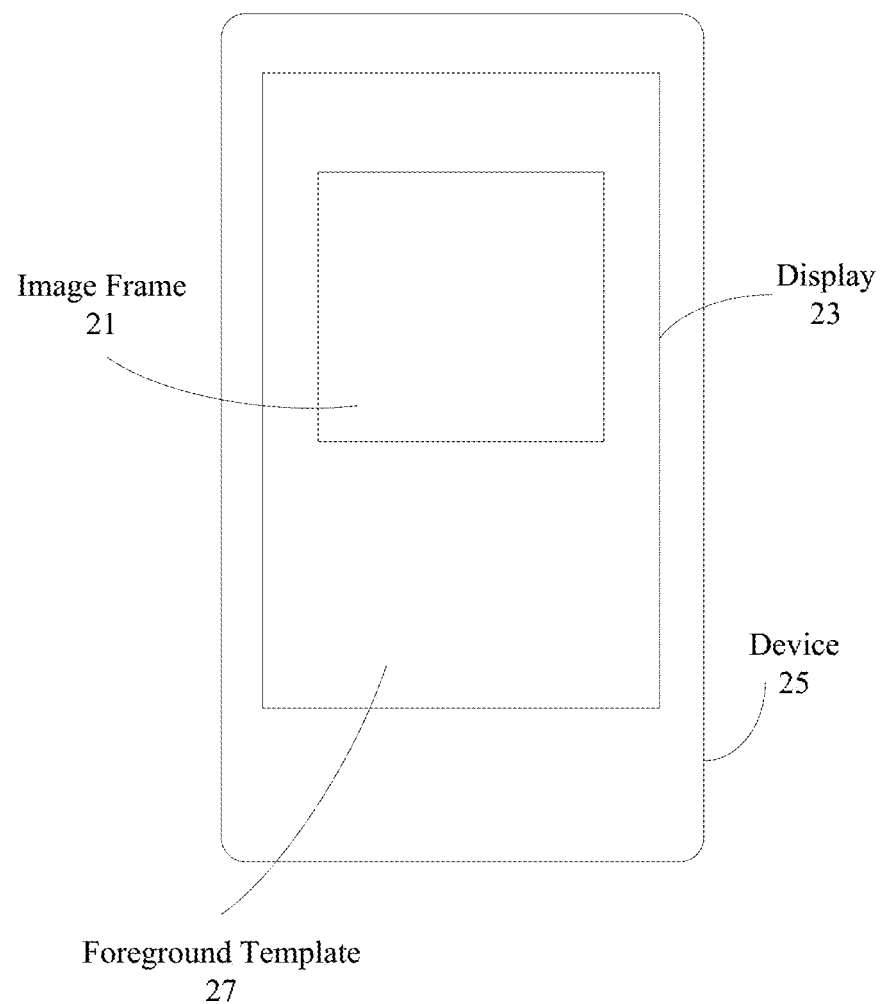
FIG. 2B is a schematic diagram of an exemplary image frame shown on a display of a device after the selection and application of the predetermined foreground template in accordance with some implementations of the present application.

In a specific implementation process, the template covers at least a portion of a photo or an image frame as illustrated in FIG. 2B. When the media content to be recorded is a video which consists of a sequence of image frames, the template covers at least a portion of each image frame rendered on the display. In some embodiments, the predetermined template selected by the user is a frame. In some embodiments, the predetermined template covers some edges of the image frame. In some embodiment, the predetermined template is blank. In some other embodiment, the predetermined template is an image with patterns. In yet another embodiment, the template is customized to the video or photo content to be captured.

In Step S102, in one embodiment, after the user selects a predetermined template, the user starts to record the video clip by using the device. The video clip recorded includes a sequence of image frames that are received from a camera or a scanning machine included or connected to the recording device.

Figure 3A:
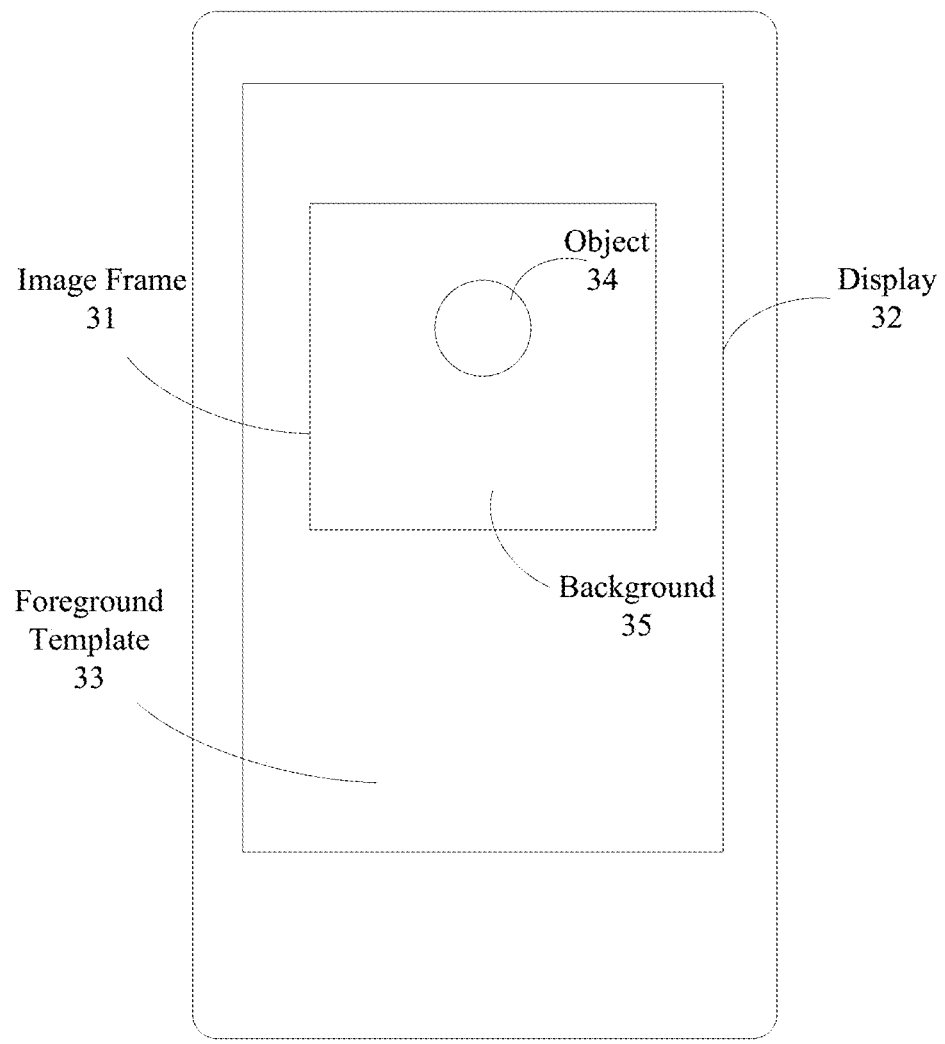
FIG. 3A is a schematic diagram of an exemplary image frame shown on a display with the predetermined foreground template applied, with one main object identified from the background in accordance with some implementations of the present application.
Figure 3B:
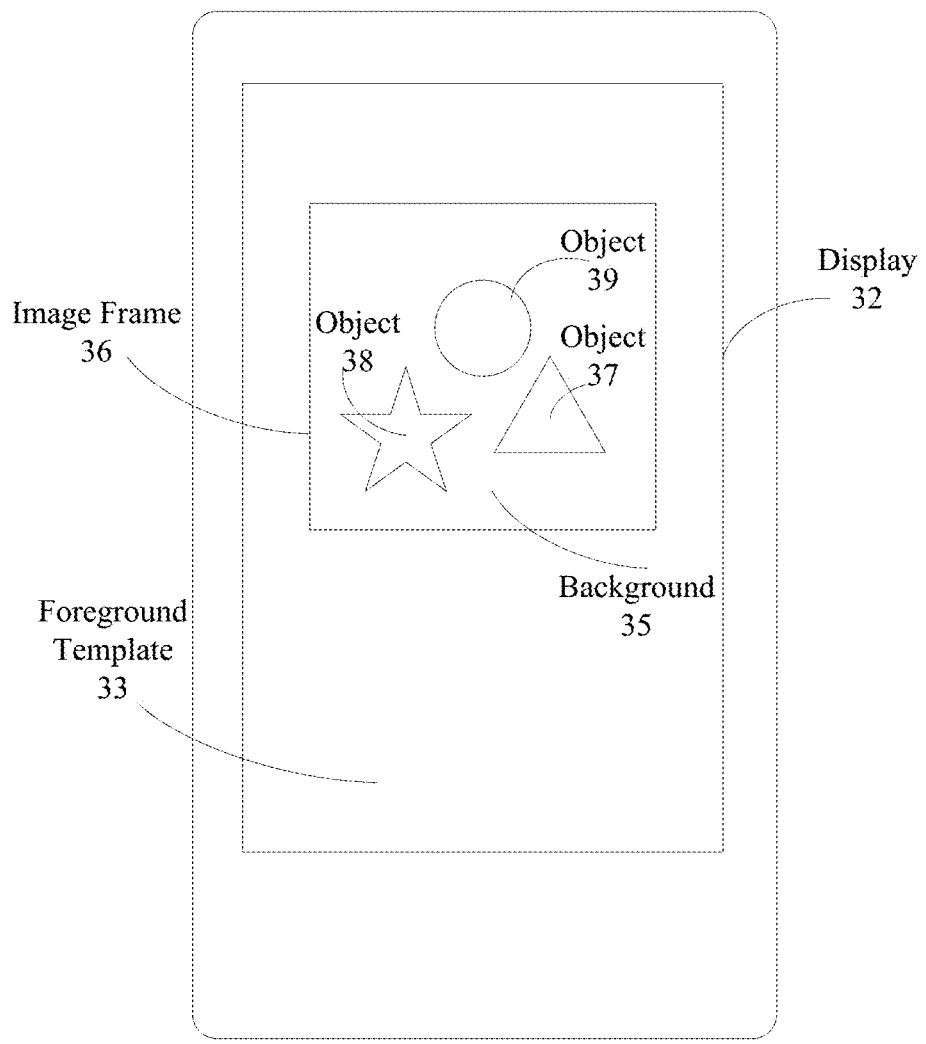
FIG. 3B is a schematic diagram of an exemplary image frame shown on a display with the predetermined foreground template applied, with more than one main objects identified from the background in accordance with some implementations of the present application.

In Step S103, the device then identifies the locations of the main objects from the sequence of the image frames. The main objects can include a moving object and/or a focusing object. An application executed by a processor can be used to recognize the locations of the moving object or focusing object by technologies such as face recognition, or motion detection. Background is separated from the main objects. In some embodiments, the background is static. In one embodiment, a single moving object can be identified as illustrated in FIG. 3A. In another embodiment, a plurality of moving objects can be identified as shown in FIG. 3B. The moving object can be a person, an animal, or a vehicle, or any of the combinations thereof. It is not necessary that all portions of the moving objects or focusing objects are moving. The moving or focusing object can be recognized by its shape.

In Step S104, the device further identifies at least a portion of the moving object or focusing object identified in Step S103. The portion of the moving object has a movement. The movement is in front of the remaining portions of the moving object.

In Step S105, the device renders the identified portion from Step S104 in front of the predetermined foreground template on the display. While the remaining portions of the moving object or focusing object, and the static background are rendered behind the predetermined foreground template on the display.

FIG. 2A is a schematic diagram of an exemplary image frame 21 shown on a display 23 of a computing device 25 before the selection and application of a predetermined template. The size of the image frame 21 is the same as the size of the display 23. Examples of a representative computing device 25 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, a point-of-sale (POS) terminal, vehicle-mounted computer, an ebook reader, or a combination of any two or more of these data processing devices or other data processing devices.

FIG. 2B is a schematic diagram of an exemplary image frame 21 shown on a display 23 of the computing device 25 after the selection and application of the predetermined foreground template 27. The predetermined template covers at least a portion of the image frame 21. In some instances, as illustrated in FIG. 2B, the predetermined template 27 has a shape of a frame which covers the edges of the image frame 21.

FIG. 3A is a schematic diagram of an exemplary image frame 31 shown on a display 32 with the predetermined foreground template 33 applied. Within the image frame 31, one moving object or one focusing object 34 is identified from the background 35. A moving object is an object with a motion. A focusing object is usually the object that the camera is focused on. The moving object or the focusing object is the main object captured on the image frame 31. Some portions of the moving or focusing object can be static.

FIG. 3B is a schematic diagram of an exemplary image frame 36 shown on a display 32 with the predetermined foreground template 33 applied. Within the image frame 36, more than one moving object or focusing objects are identified from the background 35. The moving object or the focusing object is one of the main objects captured on the image frame 36. For example, in FIG. 3B, three separate objects can be identified, such as object 37, object 38, and object 39. In some instances, there can be no overlap between the identified objects. In some instances, there can be some overlaps between the separately identified objects.

Figure 4A:
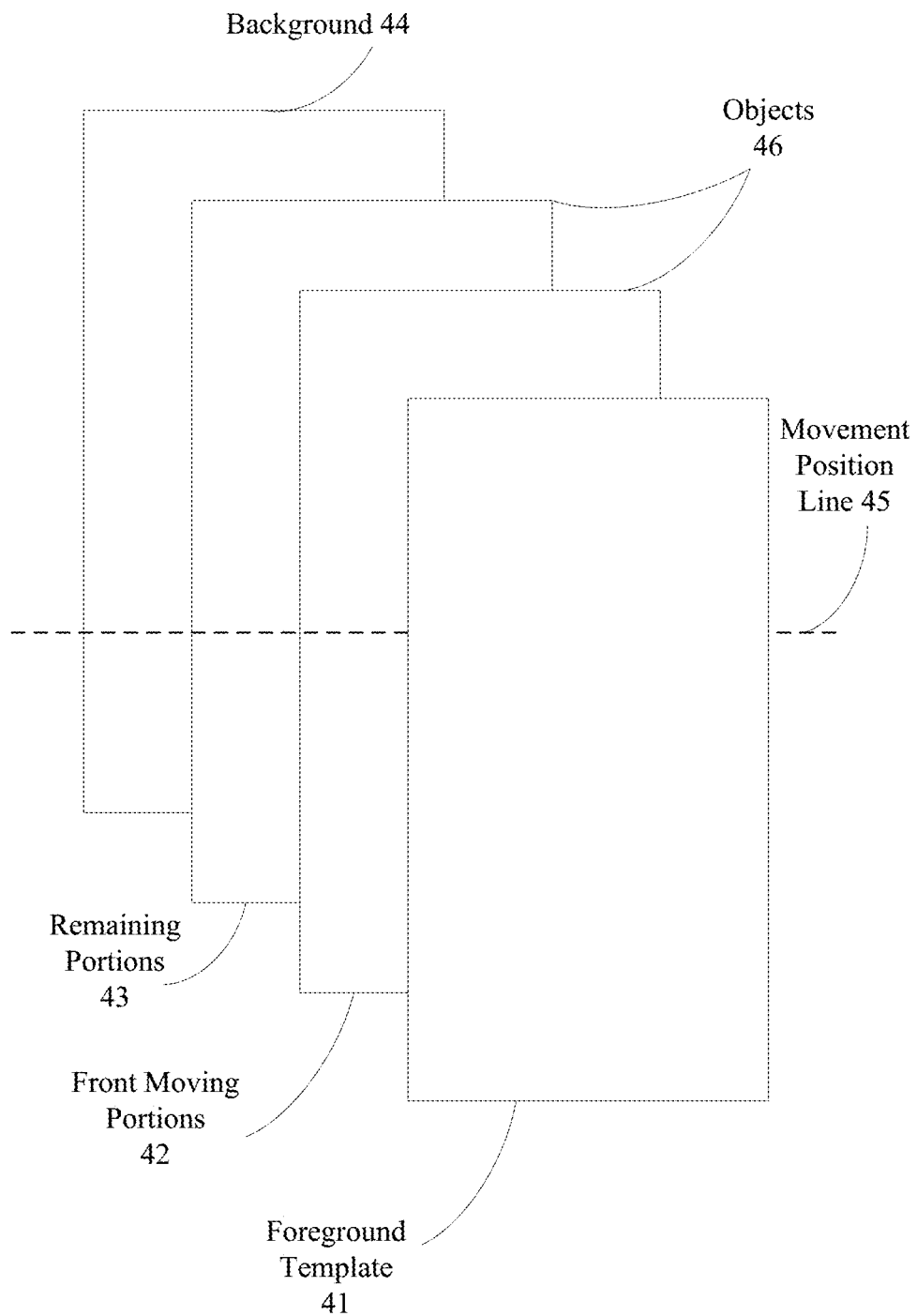
FIG. 4A is an exemplary schematic diagram showing the layers of an image frame with a foreground template before the 3D rendering process in accordance with some implementations of the present application.
Figure 4B:
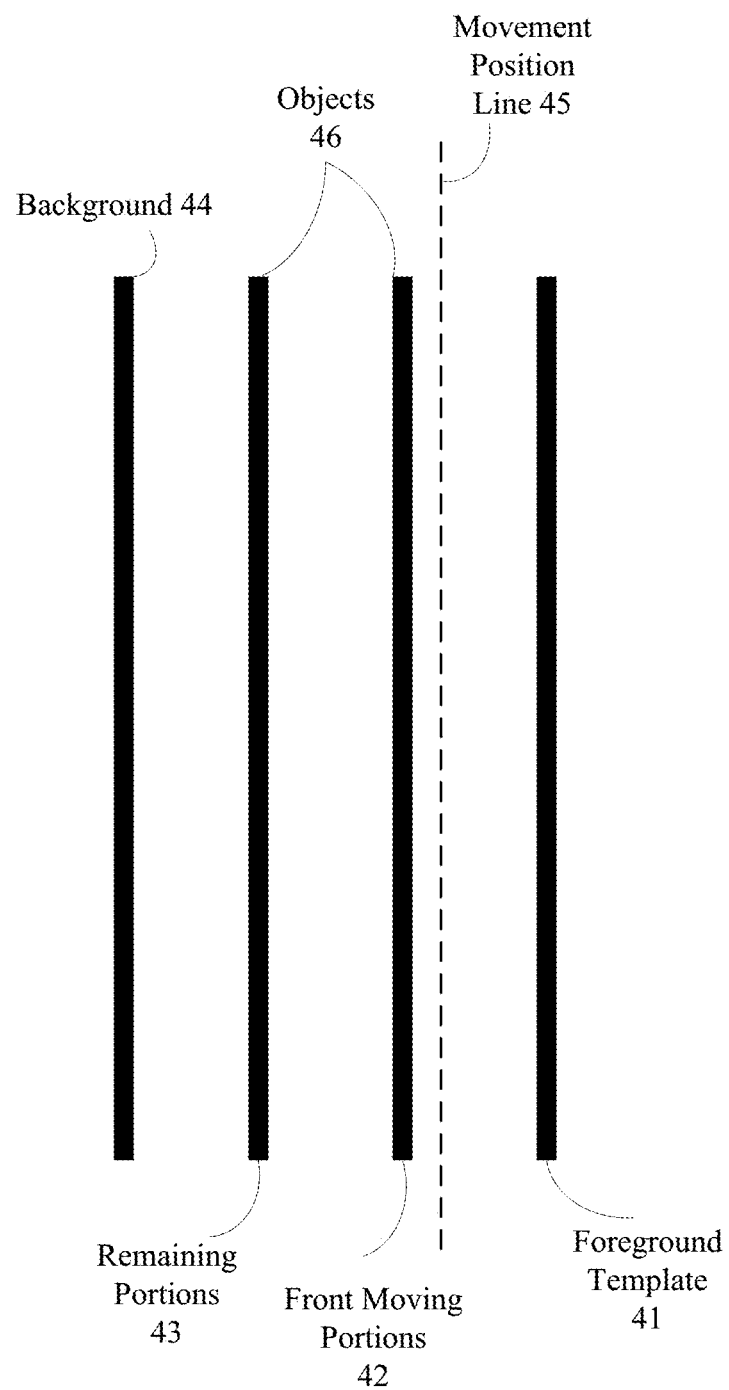
FIG. 4B is an exemplary schematic diagram showing the relative positions of the layers of an image frame with a foreground template during the identification process for the front movement portion in accordance with some implementations of the present application.
Figure 4C:
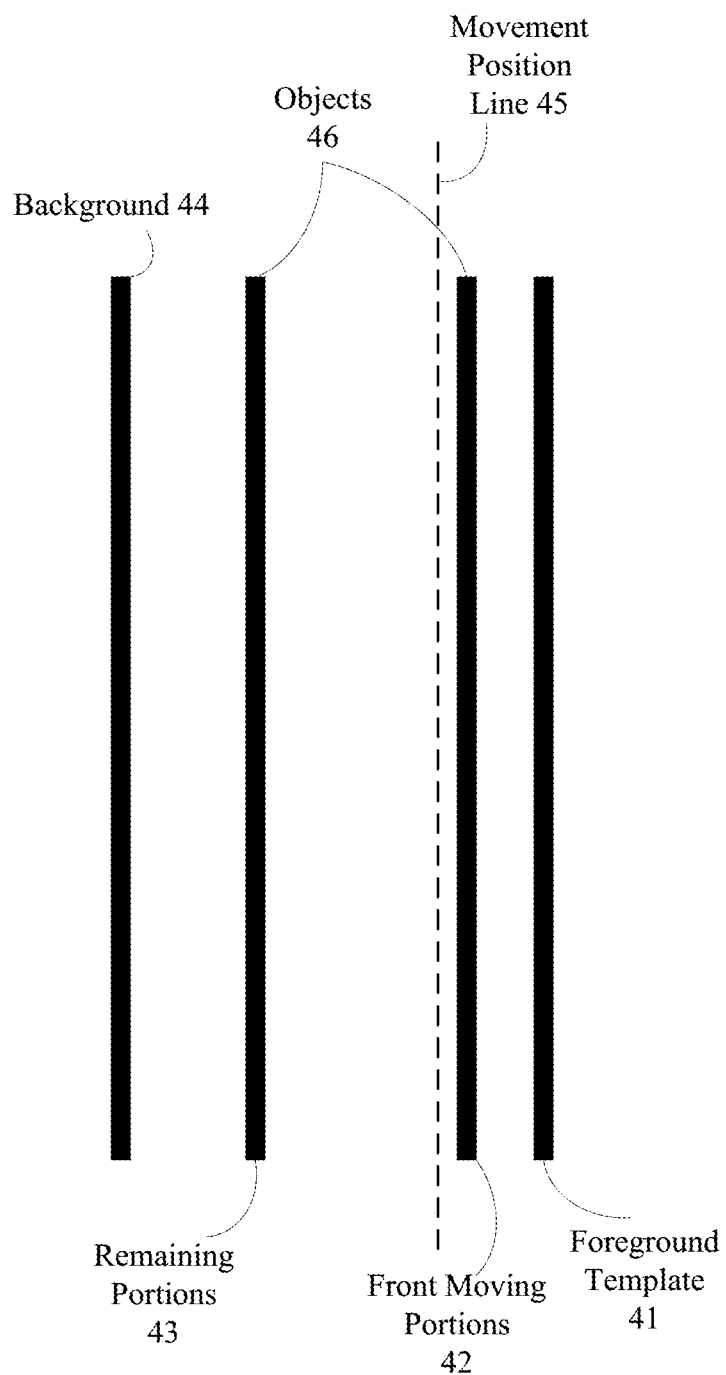
FIG. 4C is an exemplary schematic diagram showing the relative positions of the layers of an image frame with a foreground template during the identification process for the front movement portion in accordance with some implementations of the present application.
Figure 4D:
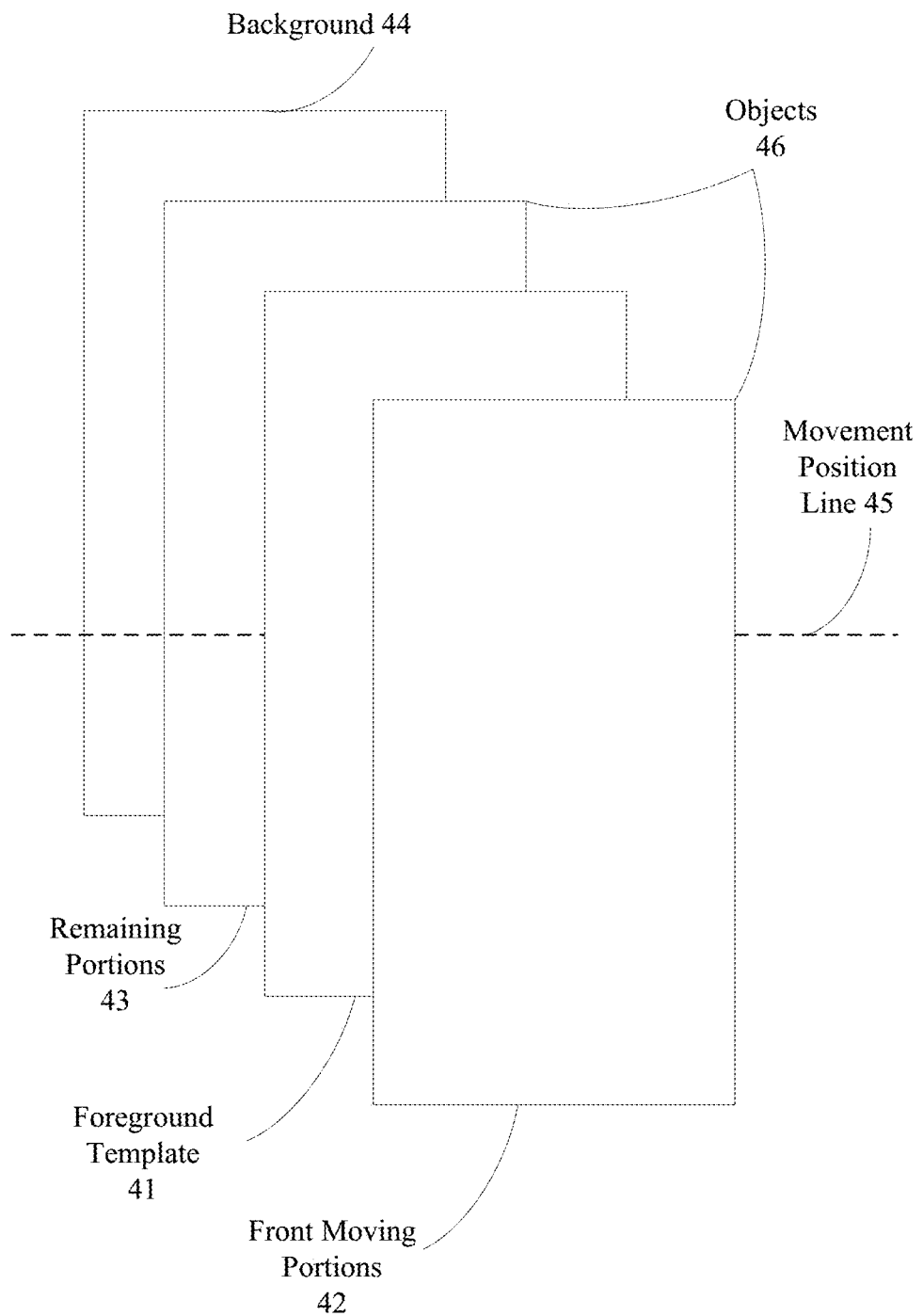
FIG. 4D is an exemplary schematic diagram showing the relative positions of the layers of an image frame with a foreground template after the 3D rendering process in accordance with some implementations of the present application.

FIG. 4A is an exemplary schematic diagram showing the layers of an image frame with a foreground template 41 before the 3D rendering process. FIG. 4B, and FIG. 4C are exemplary schematic diagrams showing the relative positions of the layers of an image frame with a foreground template 41. FIG. 4D is an exemplary schematic diagram showing the relative positions of the layers of an image frame with a foreground template 41 after the 3D rendering process.

As described in Step S101 in FIG. 1, the foreground template 41 is placed in front of the rest layers of the image frame. As described in Step S103, the locations of the moving object or focusing object 46 are separated from the background 44. According to Step S104, the portion of the moving object with a front movement 42 relative to the rest of the portion of the moving object 43 is further separated. As illustrated in Step S105, the portion of the object 42 is positioned or rendered above or in front of the foreground template 41 as shown in FIG. 4D. In one embodiment, the portion of the moving object with a front movement 42 can be part of an object 46. In another embodiment, the portion of the moving object with a front movement 42 can include multiple portions of the objects 46. Yet in another embodiment, the portion of the moving object with a front movement 42 can include multiple moving objects.

In one example, a predetermined movement position line 45 is placed before the moving object or focusing objects 46 as shown in FIG. 4A. When the portion of the moving object with a front movement 42 moves in front of the movement position line 45, as illustrated in FIG. 4C and Step S105, the portion of the objects 42 is positioned or rendered above or in front of the foreground template 41 as shown in FIG. 4D.

Figure 5A:
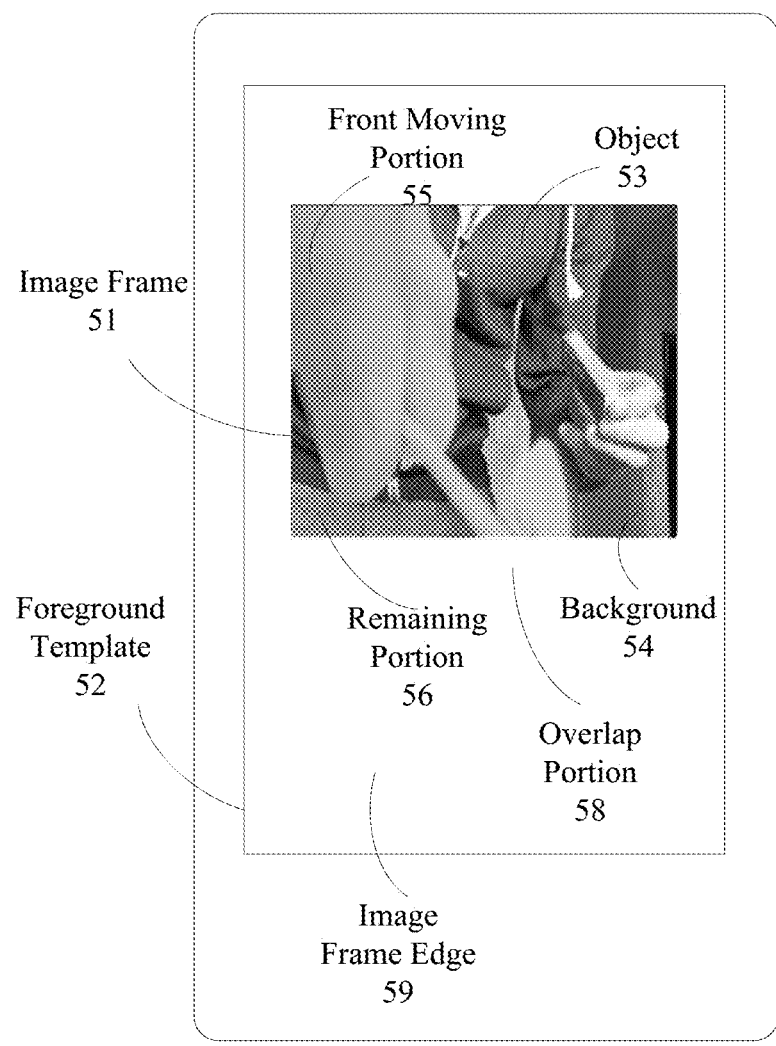
FIG. 5A is an exemplary schematic diagram of an image frame with a foreground template with one main object before the completion of the 3D generating process in accordance with some implementations of the present application.
Figure 5B:
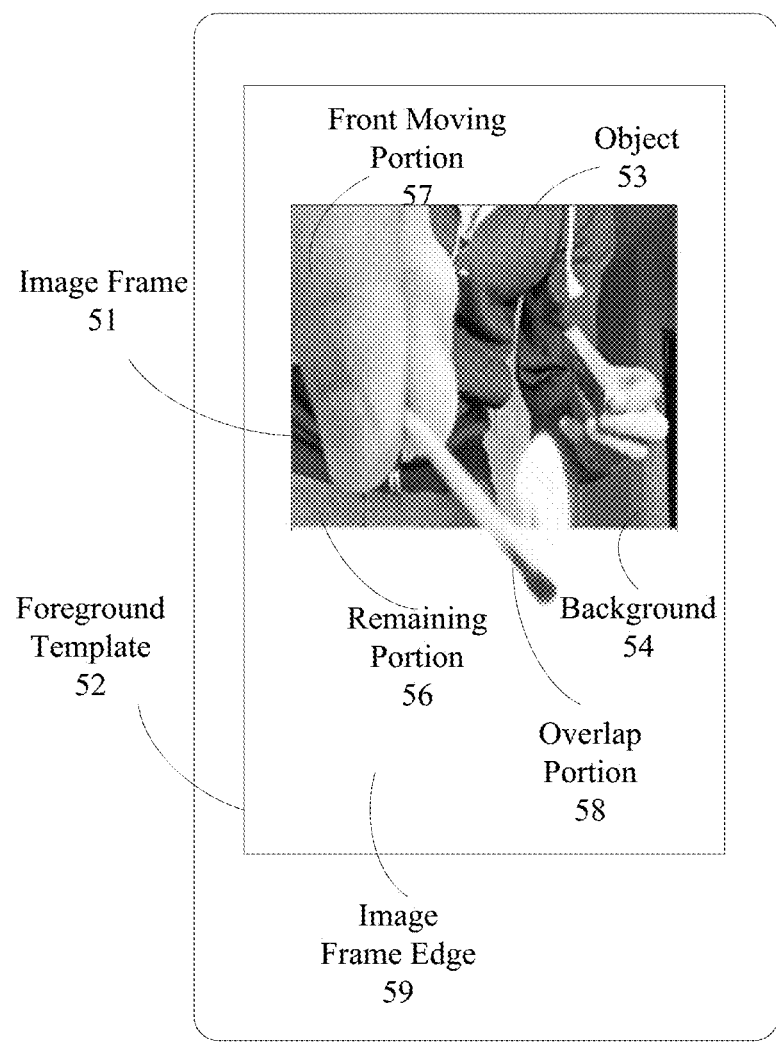
FIG. 5B is an exemplary schematic diagram of an image frame with a foreground template with one main object after the 3D generating process in accordance with some implementations of the present application.

FIG. 5A is an exemplary schematic diagram of an image frame 51 with a selected foreground template 52 before the completion of the 3D generating process described in FIG. 1. FIG. 5B is an exemplary schematic diagram of an image frame 51 with a foreground template 52 after the 3D generating process described in FIG. 1.

In one example as illustrated in FIG. 5A, one moving object or focusing object 53 is identified which is separated from the background 54 as described in Step S103. In some embodiments, a portion of the object 55 is identified as overlapping with the foreground template according to Step 104. Finally, as shown in FIG. 5B, the portion of the object 57 overlapping with the foreground template is rendered in front of the foreground template 52 according to Step 105. The front moving portion 57 in FIG. 5B and the front moving portion 55 in FIG. 5A are the same portion of the same object 53. In some embodiments, the portion of the object image with a front movement 57 rendered above the foreground template 52 has a size bigger than the portion of the object 55 before rendering.

In one embodiment also as shown in FIG. 5A, when there is an overlap 58 between the front moving portion of the object 55 and the foreground template 52, which is behind the foreground template 52, the overlap 58 is rendered in front of the foreground template 52, as shown in FIG. 5B. In one example, when the foreground template 52 covers one or more edges 59 of the image frame 51. The overlap 58 is rendered at the edge 59 of the image frame 51 on the foreground template 52 as shown in FIG. 5B.

Figure 6A:
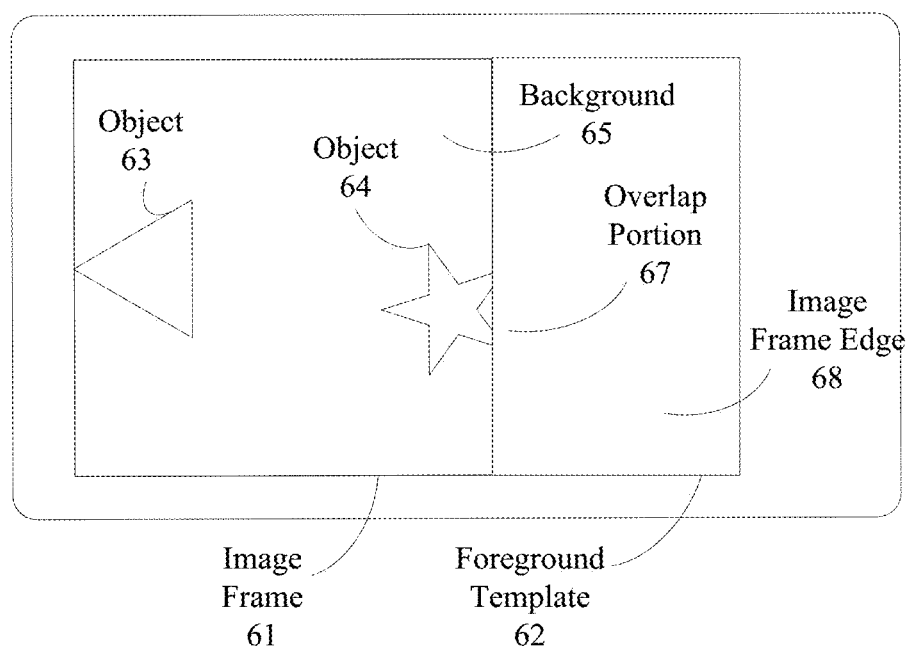
FIG. 6A is an exemplary schematic diagram of an image frame with a foreground template with more than one main objects before the completion of the 3D generating process in accordance with some implementations of the present application.
Figure 6B:
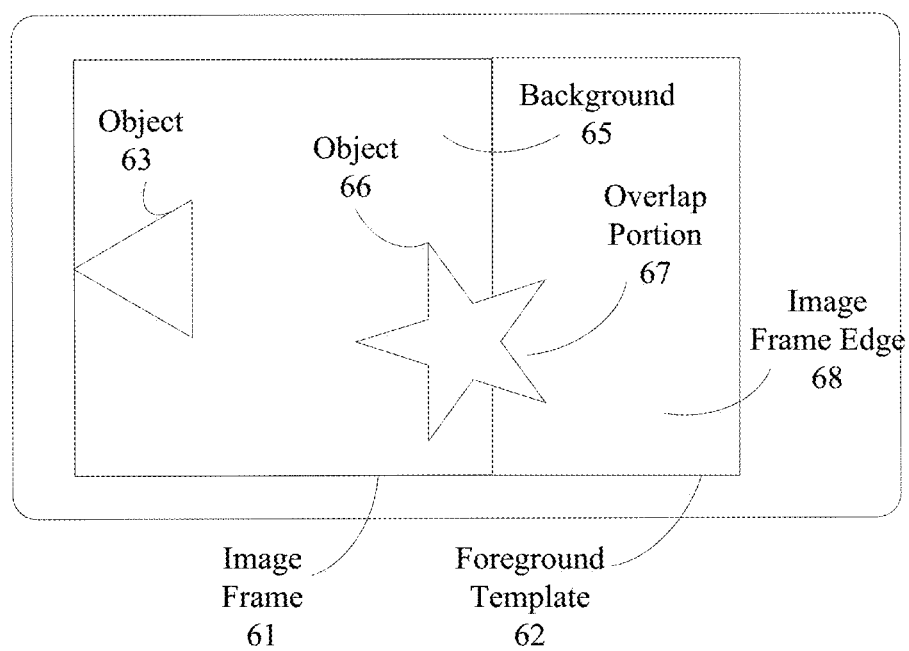
FIG. 6B is an exemplary schematic diagram of an image frame with a foreground template with more than one main objects after the 3D generating process in accordance with some implementations of the present application.

FIG. 6A is an exemplary schematic diagram of an image frame 61 with a selected foreground template 62 before the completion of the 3D generating process described in FIG. 1. FIG. 6B is an exemplary schematic diagram of an image frame 61 with a foreground template 62 after the 3D generating process described in FIG. 1. In one example as illustrated in FIG. 6A, two moving objects or focusing objects 63 and 64 are identified which are separated from the background 65 as described in Step S103. Further, one object 64 is identified as having a front movement relative to the other object 63 according to Step 104. Finally, as shown in FIG. 6B, the front moving object 66 is rendered in front of the foreground template 62 according to Step 105. The front moving object 66 in FIG. 6B and the front moving object 64 in FIG. 6A are the same object. In some embodiments, the object image with a front movement 66 rendered above the foreground template has a size bigger than the object 64 before rendering.

In one embodiment also as shown in FIG. 6A, when there is an overlapped portion 67 between the moving object 64 and the foreground template 62, which is behind the foreground template 62, the overlapped portion 67 of the moving object 64 is rendered in front of the foreground template 62 as shown in FIG. 6B. In one example, when the foreground template 62 covers one or more edges 68 of the image frame 61. The overlapped portion 67 is rendered at the edge 68 of the image frame 51 on the foreground template 62 as shown in FIG. 6B.

The final rendered image frames through the process described herein has a 3D effect. While a media or a video content is comprised of the final rendered sequence of image frames, the media content has a special 3D effect on a 2D display. The process enhances the user's interaction with the video. The user can observe the 3D effect without the aid of any 3D glasses. In some embodiments, the 3D process described herein can be applied while the user is recording a video. In some embodiments, the 3D process described herein can be applied to an already recorded video through a software application or hardware device, and in that case, a device with a camera is not necessary.

Figure 7:
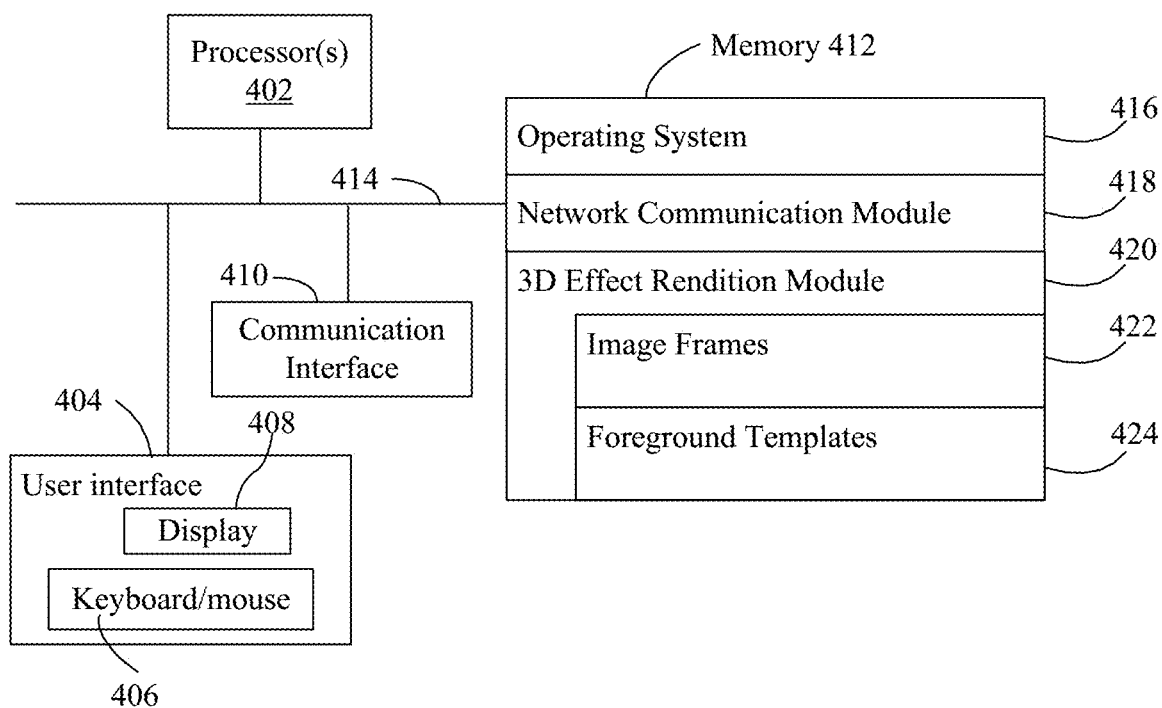
FIG. 7 is a schematic structural diagram of components of a computing device for generating three-dimensional (3D) effect on a two-dimensional display in accordance with some implementations of the present application.

FIG. 7 is a schematic structural diagram of components of a computing device 25 for generating three-dimensional (3D) effect on a two-dimensional display in accordance with some implementations of the present application. The computing device 25 includes one or more processors 402 for executing modules, programs and/or instructions stored in memory 412 and thereby performing predefined operations; one or more network or other communications interfaces 410; memory 412; and one or more communication buses 414 for interconnecting these components. In some implementations, the computing device 25 includes a user interface 404 comprising a display device 408 and one or more input devices 406 (e.g., keyboard or mouse). In some implementations, the memory 412 includes high-speed random access memory, such as DRAM, SRAM, or other random access solid state memory devices. In some implementations, memory 412 includes non-volatile memory, such as one or more magnetic disk storage devices, optical disk storage devices, flash memory devices, or other non-volatile solid state storage devices. In some implementations, memory 412 includes one or more storage devices remotely located from the processor(s) 402. Memory 412, or alternately one or more storage devices (e.g., one or more nonvolatile storage devices) within memory 412, includes a non-transitory computer readable storage medium. In some implementations, memory 412 or the computer readable storage medium of memory 412 stores the following programs, modules and data structures, or a subset thereof:

- an operating system 416 that includes procedures for handling various basic system services and for performing hardware dependent tasks;
- a network communications module 418 that is used for connecting the computing device 25 to other computers via the communication network interfaces 410 and one or more communication networks (wired or wireless), such as the Internet, other wide area networks, local area networks, metropolitan area networks, etc.; and
- a 3D effect rendition module 420 for generating three-dimensional effect on the two-dimensional display 408, the module further including one or more image frames 422 to be processed by the module and one or more foreground templates 424 used by the module for covering a portion of the display.

In the embodiments of the present application, the device can comprise one or more processors and suitable memory. In the memory, suitable software programs for performing one or more steps of the present application are stored. Alternatively, the steps of the present application can be implemented in hardware, e.g. in an application-specific integrated circuit (ASIC). The present application can also comprise instructions on a non-transitory computer-readable storage medium, and the instructions can be executed by one or more processors. Each step of the present application can be implemented as a hardware component or, alternatively, as software, e.g. running on one or more processors of each step.

In sum, the present application is disclosed with the exemplary implementations in the foregoing, but the exemplary implementations are not intended to limit the present application. Various variations and modifications made by persons of ordinary skill in the art without departing from the spirit and the scope of the present application fall within the scope of the present application. Therefore, the protection scope of the present application is subject to the appended claims.

While particular implementations are described above, it will be understood it is not intended to limit the invention to these particular implementations. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

Although the terms first, second, etc. may be used herein to describe various elements, these elements should not be limited by these terms. These terms are only used to distinguish one element from another. The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A method of generating three-dimensional (3D) effect on a two-dimensional display, comprising:
    at a computing device having one or more processors and memory storing one or more programs for execution by the one or more processors:
        receiving a sequence of image frames;
        recognizing locations of a moving object in the sequence of image frames; and
        rendering, on the display, the sequence of image frames with a predetermined foreground template covering at least a portion of each image frame rendered on the display, further including:
            when there is an overlap between the location of the moving object within a respective one of the sequence of image frames and the predetermined foreground template:
                identifying, within the image frame, at least a portion of the moving object covered by the predetermined foreground template, and rendering, on the display, the covered portion of the moving object in front of the predetermined foreground template in a size bigger than the covered portion that was fully hidden before rendering while a remaining portion of the image frame is rendered behind the predetermined foreground template.

2. The method of claim 1, further comprising:
    recognizing a static background in the sequence of image frames, the static background being distinct from the predetermined foreground template.

3. The method of claim 2, wherein the remaining portion of the image frame rendered behind the predetermined foreground template comprises a remaining portion of the moving object not covered by the predetermined foreground template and the static background.

4. The method of claim 1, wherein the method receives the sequence of image frames by capturing the sequence of image frames through a camera of the computing device.

5. The method of claim 1, wherein receiving the sequence of image frames comprises recording a video clip.

6. The method of claim 1, wherein the predetermined foreground template is selected from a plurality of foreground templates.

7. The method of claim 1, wherein the predetermined foreground template comprises a frame covering a plurality of edges of the image frame.

8. The method of claim 7, wherein the portion of the moving object covered by the predetermined foreground template is rendered at the edges of the image frame above the predetermined foreground template.

9. The method of claim 1, wherein the moving object is a human character and recognizing locations of the moving object comprises recognizing the locations of the human character by face recognition.

10. The method of claim 1, wherein recognizing locations of the moving object comprises recognizing the locations of the moving object by motion recognition.

11. The method of claim 1, wherein the moving object comprise a person, an animal, or a vehicle, or any combination thereof.

12. The method of claim 1, wherein rendering, on the display, the sequence of image frames with the predetermined foreground template comprises rendering a video clip with 3D effect.

13. A mobile device, comprising:
    a display;
    one or more processors; and memory having one or more program instructions stored thereon, which, when executed by the one or more processors, cause the processors to perform a plurality of operations including:
- receiving a sequence of image frames;
- recognizing locations of a moving object in the sequence of image frames; and
- rendering, on the display, the sequence of image frames with a predetermined foreground template covering at least a portion of each image frame rendered on the display, further including:
  - when there is an overlap between the location of the moving object within a respective one of the sequence of image frames and the predetermined foreground template:
    - identifying, within the image frame, at least a portion of the moving object covered by the predetermined foreground template, and rendering, on the display, the covered portion of the moving object in front of the predetermined foreground template in a size bigger than the covered portion that was fully hidden before rendering while a remaining portion of the image frame is rendered behind the predetermined foreground template.

14. The mobile device of claim 13, wherein the moving object is a human character and the operation of recognizing locations of the moving object comprises recognizing the locations of the human character by face recognition.

15. The mobile device of claim 13, wherein the plurality of operations further comprise:
- recognizing a static background in the sequence of image frames, the static background being distinct from the predetermined foreground template.

16. The mobile device of claim 15, wherein the remaining portion of the image frame rendered behind the predetermined foreground template comprises a remaining portion of the moving object not covered by the predetermined foreground template and the static background.

17. A non-transitory computer-readable storage medium, having instructions stored thereon, which, when executed by one or more processors of a mobile device, cause the processors to perform a plurality of operations including:
- receiving a sequence of image frames;
- recognizing locations of a moving object in the sequence of image frames; and
- rendering, on a display of the mobile device, the sequence of image frames with a predetermined foreground template covering at least a portion of each image frame rendered on the display, further including:
  - when there is an overlap between the location of the moving object within a respective one of the sequence of image frames and the predetermined foreground template:
    - identifying, within the image frame, at least a portion of the moving object covered by the predetermined foreground template, and rendering, on the display, the covered portion of the moving object in front of the predetermined foreground template in a size bigger than the covered portion that was fully hidden before rendering while a remaining portion of the image frame is rendered behind the predetermined foreground template.

18. The non-transitory computer-readable storage medium of claim 17, wherein the moving object is a human character and the operation of recognizing locations of the moving object comprises recognizing the locations of the human character by face recognition.

19. The non-transitory computer-readable storage medium of claim 17, wherein the plurality of operations further comprise:
- recognizing a static background in the sequence of image frames, the static background being distinct from the predetermined foreground template.

20. The non-transitory computer-readable storage medium of claim 19, wherein the remaining portion of the image frame rendered behind the predetermined foreground template comprises a remaining portion of the moving object not covered by the predetermined foreground template and the static background.

* * * * *